United States Patent
Chen et al.

(10) Patent No.: US 11,270,014 B1
(45) Date of Patent: Mar. 8, 2022

(54) SYSTEMS AND METHODS FOR UTILIZING METADATA FOR PROTECTING AGAINST THE SHARING OF IMAGES IN A COMPUTING NETWORK

(71) Applicant: CA, Inc., San Jose, CA (US)

(72) Inventors: Joseph Chen, Culver City, CA (US); QuBo Song, Playa Vista, CA (US); Chris Houston, Toronto (CA)

(73) Assignee: CA, Inc., New York, NY (US)

( * ) Notice: Subject to any disclaimer, the term of this patent is extended or adjusted under 35 U.S.C. 154(b) by 452 days.

(21) Appl. No.: 16/433,761

(22) Filed: Jun. 6, 2019

(51) Int. Cl.
| H04L 29/06 | (2006.01) |
| G06F 21/62 | (2013.01) |
| G06F 16/176 | (2019.01) |
| G06T 11/60 | (2006.01) |
| H04L 67/10 | (2022.01) |

(52) U.S. Cl.
CPC ........ *G06F 21/6218* (2013.01); *G06F 16/176* (2019.01); *G06T 11/60* (2013.01); *H04L 63/0428* (2013.01); *H04L 67/10* (2013.01)

(58) Field of Classification Search
CPC .... G06F 21/6218; G06F 16/176; G06T 11/60; H04L 63/0428; H04L 67/10
See application file for complete search history.

(56) References Cited

U.S. PATENT DOCUMENTS

| 9,928,393 B1* | 3/2018 | Barnum | G06T 11/001 |
| 2012/0259932 A1* | 10/2012 | Kang | H04L 51/066 709/206 |
| 2013/0074191 A1* | 3/2013 | Ben-Reuven | G06F 21/6209 726/26 |
| 2014/0324605 A1* | 10/2014 | Steelberg | G06Q 30/0277 705/14.73 |
| 2015/0339838 A1* | 11/2015 | Friedman | G06K 7/1417 345/641 |
| 2016/0078335 A1* | 3/2016 | Annamalai | G06K 19/06103 382/284 |
| 2017/0124349 A1* | 5/2017 | Anantapur Bache | G06F 21/6245 |

OTHER PUBLICATIONS

Zigomitros et al., "Storing Metadata as QR Codes in Multimedia Streams", URL: https://link.springer.com/chapter/10.1007/978-3-319-03437-9_16, Metadata and Semantics Research, CCIS, vol. 390, 2013, pp. 152-162.

* cited by examiner

*Primary Examiner* — Shin-Hon (Eric) Chen
(74) *Attorney, Agent, or Firm* — Foley & Lardner LLP

(57) ABSTRACT

The disclosed computer-implemented method for utilizing metadata for protecting against the sharing of images in a computing network may include (i) identifying an image file stored in a public folder on a computing device, (ii) storing a copy of the image file within a secure data storage application, (iii) encoding metadata for revealing an image in the image file, (iv) performing a security action that protects against sharing the image file from the public folder by masking the image in the image file with the encoded metadata, and (v) rendering the image in the image file as an unmasked version of the image from the image file or the copy of the image file in the secure data storage application by decoding the metadata utilized to mask the image. Various other methods, systems, and computer-readable media are also disclosed.

16 Claims, 7 Drawing Sheets

SYSTEMS AND METHODS FOR UTILIZING METADATA FOR PROTECTING AGAINST THE SHARING OF IMAGES IN A COMPUTING NETWORK

BACKGROUND

Security features associated with protecting data on enterprise and consumer computing devices may include preventing certain types of data from being accidentally seen by others or shared over a network. For example, traditional security software running on a user computing device may be configured to modify sensitive image files so that that original images are concealed or replaced with other images (e.g., a default generic image) in a device image album, thereby preventing access to sensitive content. However, traditional security software may often fail to provide a direct recovery path to the original image thus hampering its retrieval when, for example, a user forgets which content was replaced by a generic image in the device image album.

SUMMARY

As will be described in greater detail below, the present disclosure describes various systems and methods for utilizing metadata for protecting against the sharing of images in a computing network.

In one example, a method for utilizing metadata for protecting against the sharing of images in a computing network may include (i) identifying an image file stored in a public folder on a computing device, (ii) storing a copy of the image file within a secure data storage application, (iii) encoding metadata for revealing an image in the image file from the image file or the copy of the image file in the secure data storage application, (iv) performing a security action that protects against sharing the image file from the public folder by masking the image in the image file with the encoded metadata, and (v) rendering the image in the image file as an unmasked version of the image from the image file or the copy of the image file in the secure data storage application by decoding the metadata utilized to mask the image in the public folder.

In some examples, the copy of the image file may be stored within the secure data storage application by saving the copy of the image file to a private folder of a sandbox application. In some embodiments, encoding a file path pointing to a location of the copy of the image file into a visible pattern.

In some examples, the security action may include overlaying a visible pattern over the image in the image file to prevent viewing of the image. Additionally or alternatively, the security action may include overlaying a visible pattern over the image in the image file to prevent the image from being shared to a remote data storage service during a backup operation.

In some embodiments, the unmasked version of the image may be rendered by (i) receiving a request to open the image file comprising the masked image in the public folder, (ii) authenticating the request, (iii) decoding the metadata to reveal the unmasked version of the image, (iv) retrieving the unmasked version from the image file or the copy of the image file, and (v) rendering the unmasked version of the image in response to the request. In some examples, the unmasked version of the image may be rendered by opening the copy of the image file to display the unmasked version of the image in a private folder within the secure data storage application. In one example, the private folder may be restricted to authenticated users of the secure data storage application.

In some embodiments, the image may include sensitive visual content. In some examples, the public folder may include a shared image album in an image application on the computing device.

In one embodiment, a system for utilizing metadata for protecting against the sharing of images in a computing network may include at least one physical processor and physical memory that includes multiple modules and computer-executable instructions that, when executed by the physical processor, cause the physical processor to (i) identify, by an identification module, an image file stored in a public folder on a computing device, (ii) store, by a storage module, copy of the image file within a secure data storage application on the computing device, (iii) encode, by an encoding module, metadata for revealing an image in the image file from the image file or the copy of the image file in the secure data storage application, (iv) perform, by a security module, a security action that protects against sharing the image file from the public folder by masking the image in the image file with the encoded metadata, and (v) render, by a rendering module, the image in the image file as an unmasked version of the image from the image file or the copy of the image file in the secure data storage application by decoding the metadata utilized to mask the image in the public folder.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify an image file stored in a public folder on the computing device, (ii) store a copy of the image file within a secure data storage application on the computing device, (iii) encode metadata for revealing an image in the image file from the image file or the copy of the image file in the secure data storage application, (iv) perform a security action that protects against sharing the image file from the public folder by masking the image in the image file with the encoded metadata, and (v) render the image in the image file as an unmasked version of the image from the image file or the copy of the image file in the secure data storage application by decoding the metadata utilized to mask the image in the public folder.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
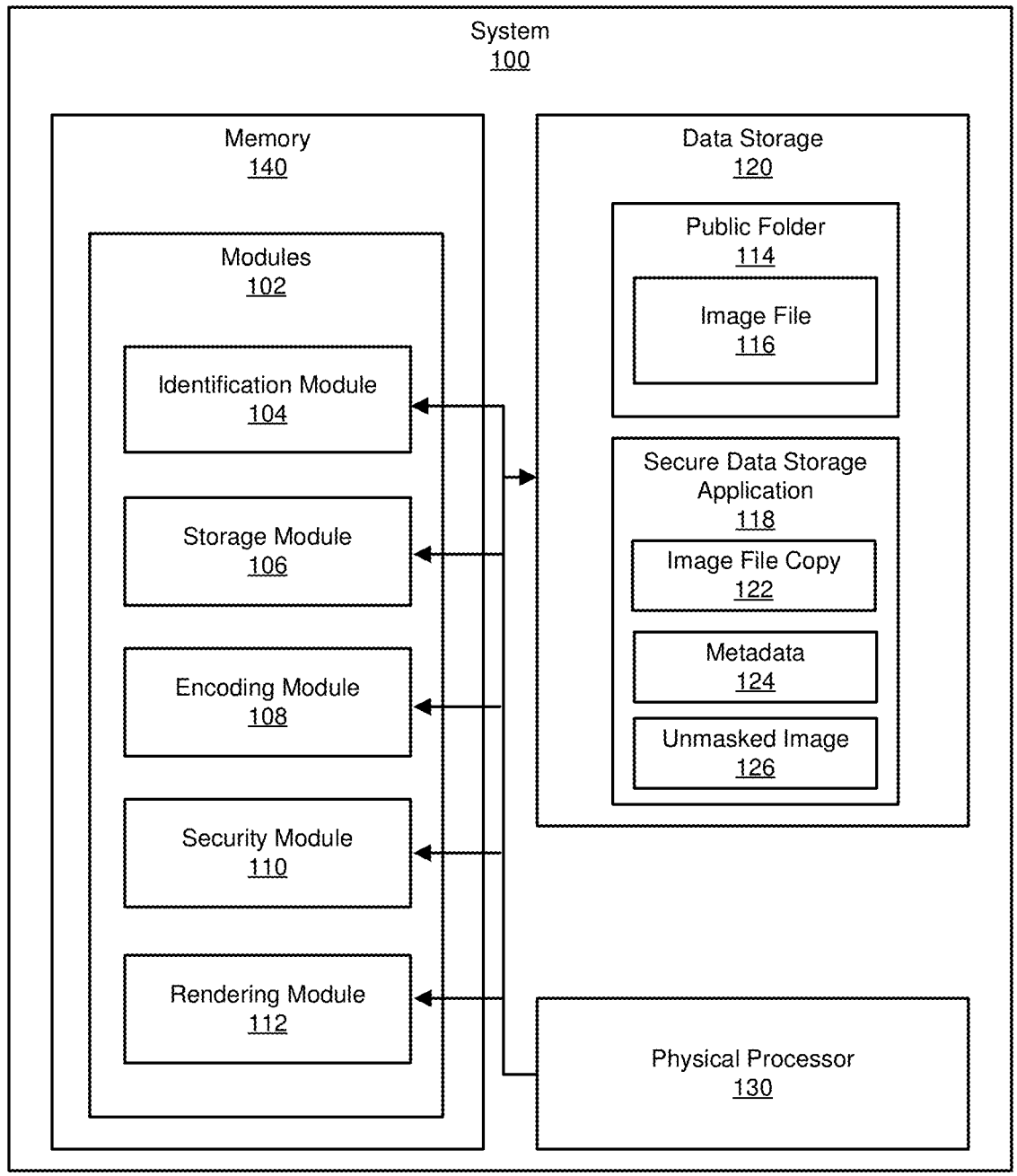
FIG. 1 is a block diagram of an example system for utilizing metadata for protecting against the sharing of images in a computing network.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for utilizing metadata for protecting against the sharing of images in a computing network. As will be described in greater detail below, the systems and methods described herein may encode metadata for revealing an image in the image file from the image file or a copy of the image file in the secure data storage application (e.g., a sandbox application) on a computing device. Then, a security action may be performed that protects against sharing of the original image file from a public folder by masking the image in the image file with the encoded metadata. Finally, an unmasked version of the image from the image file or the copy of the image file in the secure data storage application may be rendered by decoding the metadata utilized to mask the image in the public folder. In this way, the systems and methods described herein may overcome drawbacks associated with traditional methods utilized to recover sensitive images that have been protected on a computing device without a logical recovery path to the original unprotected images for viewing by a user.

In addition, the systems and methods described herein may improve the security of a computing device by preventing the sharing of image files containing sensitive content to network backup services and/or with users other than a primary user of the computing device associated with the sensitive content.

Figure 2:
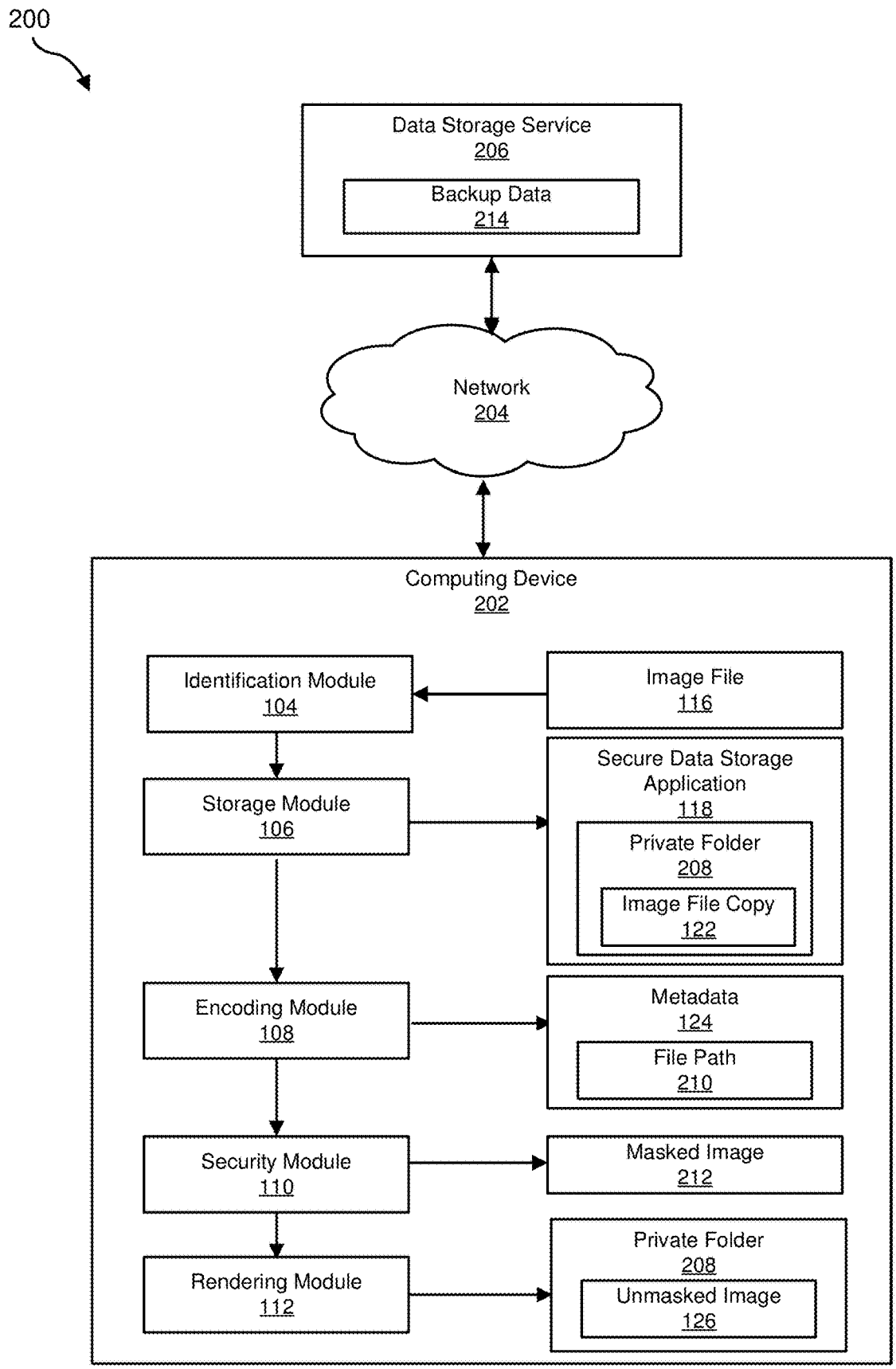
FIG. 2 is a block diagram of an additional example system for utilizing metadata for protecting against the sharing of images in a computing network.

The following will provide, with reference to FIGS. 1-2, detailed descriptions of example systems for utilizing metadata for protecting against the sharing of images in a computing network. Detailed descriptions of corresponding computer-implemented methods will also be provided in connection with FIG. 3. Detailed descriptions of example user interfaces generated by an example system for utilizing metadata for protecting against the sharing of images in a computing network, will also be provided in connection with FIGS. 4-5. In addition, detailed descriptions of an example computing system and network architecture capable of implementing one or more of the embodiments described herein will be provided in connection with FIGS. 6 and 7, respectively.

FIG. 1 is a block diagram of an example system 100 for utilizing metadata for protecting against the sharing of images in a computing network. As illustrated in this figure, example system 100 may include one or more modules 102 for performing one or more tasks. As will be explained in greater detail below, modules 102 may include an identification module 104 that Identifies an image file stored in a public folder on a computing device. Example system 100 may additionally include a storage module 104 that stores a copy of the image file within a secure data storage application on the computing device. Example system 100 may also include an encoding module 108 that encodes metadata for revealing an image in the image file from the image file or the copy of the image file in the secure data storage application. Example system 100 may additionally include a security module 110 that performs a security action that that protects against sharing the image file from the public folder by masking the image in the image file with the encoded metadata. Example system 100 may also include a rendering module 112 that renders the image in the image file as an unmasked version of the image from the image file or the copy of the image file in the secure data storage application by decoding the metadata in the visible pattern utilized to mask the image in the public folder. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate utilizing metadata for protecting against the sharing of images in a computing network. Examples of physical processor 130 include, without limitation, microprocessors, microcontrollers, Central Processing Units (CPUs), Field- Programmable Gate Arrays (FPGAs) that implement soft-core processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example data storage 120 may store a public folder 114 containing an image file 116. In some examples, image file 116 may include a photographic image captured by a mobile computing device. Additionally, image file 116 may contain sensitive content (e.g., content which a user may not wish to be uploaded to a backup server and/or share with others). Data storage 120 may also include a secure data storage application 118. In some examples, secure data storage application 118 may be a sandbox application configured to perform various tasks (e.g., masking sensitive content in image file 116) and that stores image file copy 122 (i.e., a copy of image file 116), metadata 124, and an unmasked image 126. As will be described in greater detail below, unmasked image 126 may be an original image in a image file 116.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with data storage service 206 via a network 204. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to utilize metadata for protecting against the sharing of images in a computing network.

For example, and as will be described in greater detail below, identification module 104 may receive image file 116. Then, storage module 106 may store a copy of image file 116 in a private folder 208. Next, encoding module 108 may encode metadata 124 for revealing an image in image file 116 from either image file 116 or image file copy 122. Then security module 110 may create masked image 212 by masking the image in image file 116 with encoded metadata 124, thereby preventing the image from being viewed or shared to data storage service 206 in backup data 214 generated by computing device 202. Finally, rendering module 112 may render the image in image file 116 an unmasked version of the image (i.e., unmasked image 126) from either image file 116 or image file copy 122 in secure data storage application 118 by decoding metadata 124 utilized to mask the image in image file 116 in public folder 114.

Computing device 202 generally represents any type or form of computing device capable of reading computer-executable instructions. In some examples, computing device 202 may be a mobile computing device with camera functionality utilized for capturing, storing, and initiating a backup of photographic images to a remote data storage service. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Data storage service 206 generally represents any type or form of computing device that is capable of storing data from one or more client computing devices (e.g., computing device 202) over a network connection. In some examples, data storage service 206 may be a cloud backup server on a closed computing platform configured to perform automatic backups of image files (e.g., photographs) captured by a camera associated with computing device 202. Additional examples of data storage service 206 include, without limitation, security servers, application servers, web servers, storage servers, and/or database servers configured to run certain software applications and/or provide various security, web, storage, and/or database services. Although illustrated as a single entity in FIG. 2, data storage service 206 may include and/or represent a plurality of servers that work and/or operate in conjunction with one another.

Network 204 generally represents any medium or architecture capable of facilitating communication or data transfer. In one example, network 204 may facilitate communication between computing device 202 and data storage service 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
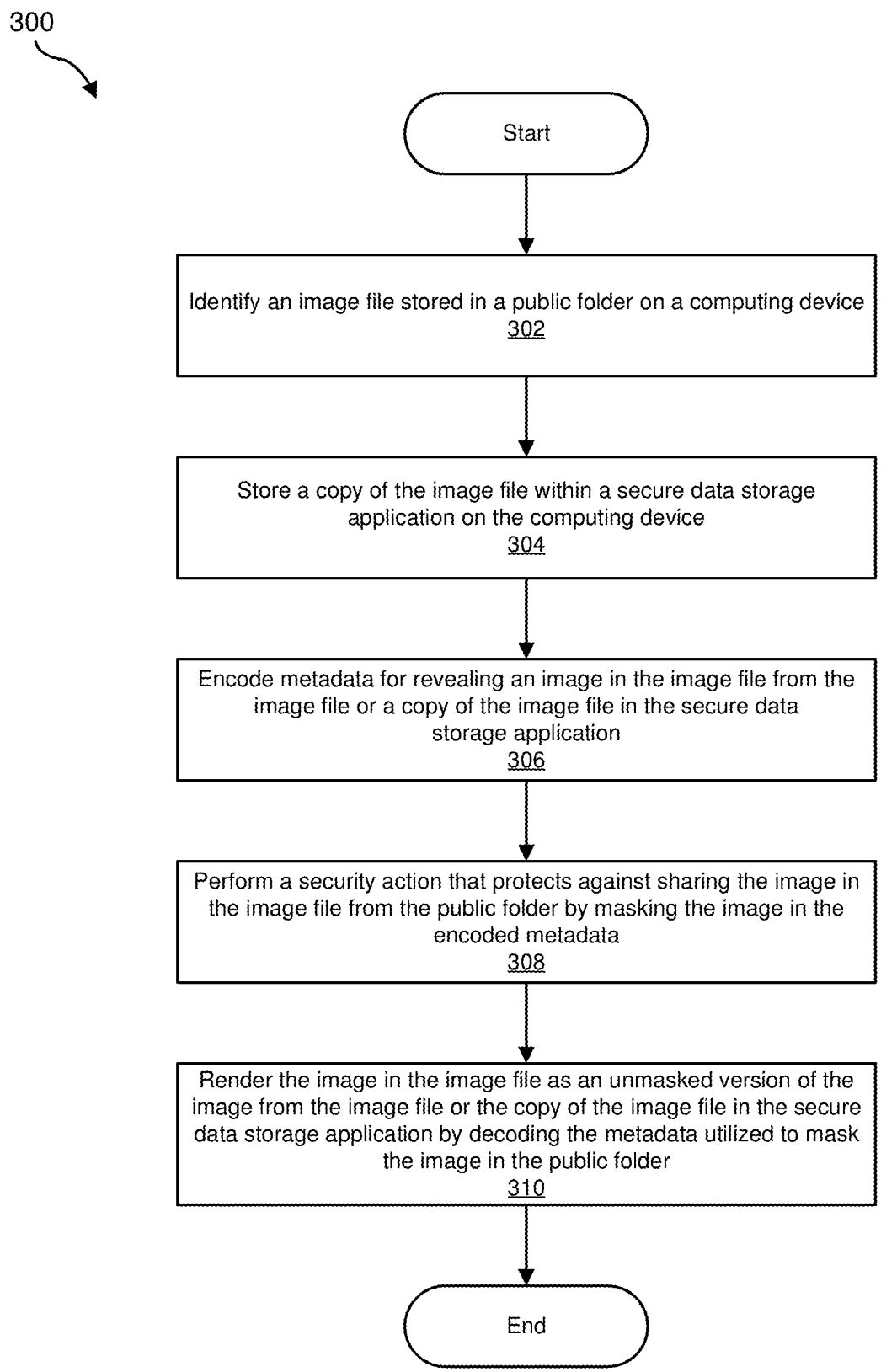
FIG. 3 is a flow diagram of an example method for utilizing metadata for protecting against the sharing of images in a computing network.

FIG. 3 is a flow diagram of an example computer-implemented method 300 for utilizing metadata for protecting against the sharing of images in a computing network. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify an image file stored in a public folder on a computing device. For example, identification module 104 may, as part of computing device 202 in FIG. 2, identify image file 116 stored in public folder 114 on computing device 202.

The term "image file," as used herein, generally refers to any type of file containing data representing an image (i.e., depiction) of a subject or object captured by a computing device. For example, an image file may be a file containing a photograph, screenshot, or other two-dimensional picture of a human subject and/or a physical object captured by and stored on a computing device.

Identification module 104 may identify image file 116 in a variety of ways. In some embodiments, identification module 104 may access public folder 114, which may be a shared image album in an image application for storing images on computing device 202, and then scan for any photographic images stored therein.

At step 304, one or more of the systems described herein may store a copy of the image file identified at step 302 within a secure data storage application. For example, storing module 106, may, as part of computing device 202 in FIG. 2, store a copy of image file 116 as image file copy 122 in secure data storage application 118.

The term "secure data storage application," as used herein, generally refers to any software application running in a restricted operating system environment on a computing system that isolates certain files and/or programs from access by other applications as well as network access (e.g., cloud backup server access). Thus, the isolated files and/or programs may only be retrieved by the secure data storage application. In some examples, a secure data storage application may be a sandbox application containing one or more private folders for storing data files apart from other files stored on a computing device.

Storage module 106 may store image file copy 122 in a variety of ways. In some embodiments, storage module 106 may save image file copy 122 to private folder 208 in secure data storage application 118. In some examples, private folder 208 may be utilized by secure data storage application 118 to store images containing sensitive content.

The term "sensitive content," as used herein, generally refers to any images containing content that a user of a computing device does not wish to share (e.g., with other users of the computing device, users of other computing devices, and/or a cloud backup server). In some examples, sensitive content may include predetermined image categories specified by a user. For example, predetermined sensitive content image categories may include, without limitation, whiteboard images captured during meetings at the user's place of employment, family photographs, and photographs associated with private and public user activity (e.g., bars, clubs, wine bottles, etc.).

At step 306, one or more of the systems described herein may encode metadata identifying a file path pointing to a location of the copy of the image file in the secure data storage application, into a visible pattern. For example, encoding module 108, may, as part of computing device 202 in FIG. 2, encode metadata 124 for revealing an image in image file 116 from either image file 116 or image file copy 122 in secure data storage application 118.

Encoding module 108 may encode metadata 124 in a variety of ways. For example, encoding module 108 may encode file path 210 pointing to a location of image file copy 122 into a visual pattern. In some embodiments, the visual pattern may be a machine-readable optical label, such as a bar code. For example, encoding module 108 may encode file path 210 as metadata 124 into a QR code. Additionally or alternatively, encoding module 108 may encode information utilized to directly reveal an original copy of the image from image file 116. For example, encoding module 108 may encode information utilized to perform (and reverse) a mathematical transformation for masking the image in image file 116. Example mathematical transformations may include, without limitation, modifying the image by using pixel repositioning, adding noise, and/or color manipulation.

At step 308, one or more of the systems described herein may perform a security action that protects against sharing the image file from the public folder by masking the image in the image file with the encoded metadata. For example, security module 110, may, as part of computing device 202 in FIG. 2, perform a security action that masks the image in image file 116 in public folder 114, thereby creating masked image 212.

Security module 110 may mask the image in image file 116 in a variety of ways. For example, security module 110 may overlay a visible pattern representing metadata 124 over the image in image file 116 in public folder 114 to create masked image 212, thereby preventing viewing of the image in public folder 114. Additionally or alternatively, security module 110 may overlay a visible pattern over the image in image file 116 in public folder 114 to create masked image 212, thereby preventing the image from being shared to data storage service 206 during a backup operation for computing device 202. In some examples, the visible pattern in masked image 212 may be a machine-readable optical label with encoded metadata 124 (e.g., file path 210) pointing to a location of image file copy 122 in secure data storage application 118. Additionally or alternatively, security module 110 may modify the image in image file 116 to make it unrecognizable from the original version and thereby create a visible pattern representing masked image 212. As a non-limiting example, an example image modification that may be performed by security module 110 includes performing a mathematical transformation on the original image (e.g., pixel repositioning, adding noise, color manipulation, etc.).

At step 310, one or more of the systems described herein may render the image in the image file as an unmasked version of the image from either the image file or the copy of the image file in the secure data storage application by decoding the metadata utilized to mask the image in the public folder. For example, rendering module 112, may, as part of computing device 202 in FIG. 2, render unmasked image 126 from either image file 116 or image file copy 122 in private folder 208 by decoding metadata 124 utilized to create masked image 212.

Rendering module 112 may render unmasked image 126 in a variety of ways. For example, rendering module 112 may receive a user request to open masked image 212. Then, rendering module 112 may authenticate the user request (e.g., by requesting and verifying a user password associated with accessing secure data storage application 118 on computing device 202. Next, rendering module 112 may decode metadata 124 to reveal unmasked image 126. For example, rendering module 112 may scan a visible pattern (e.g., a QR code) overlaying the image in image file 116 representing metadata 124 for decoding file path 210 pointing to the location of image file copy 122 in secure data storage application 118. Additionally or alternatively, rendering module 112 may decrypt metadata 124 to reverse a mathematical transformation (e.g., pixel repositioning) performed on an image (e.g., the original image) in image file 116. Then, rendering module 112 may retrieve unmasked image 126. For example, rendering module 112 may retrieve file path 210 pointing to the location of image file copy 122 containing unmasked image 126 in private folder 208 within secure data storage application 118. Additionally or alternatively, rendering module 112 may retrieve image file 116 (containing unmasked image 126 as the original image) from public folder 114. Finally, rendering module 112 may render unmasked image 126 as a response to the user request. In some examples, unmasked image 126 may be rendered by opening image file copy 122 to display unmasked image 126 in private folder 208 within secure data storage application 118. In other examples, unmasked image 126 may be rendered by opening image file 116 (i.e., after the decryption of metadata 124). In some examples, access to private folder 208 may be restricted to only authenticated users of secure data storage application 118.

Figure 4:
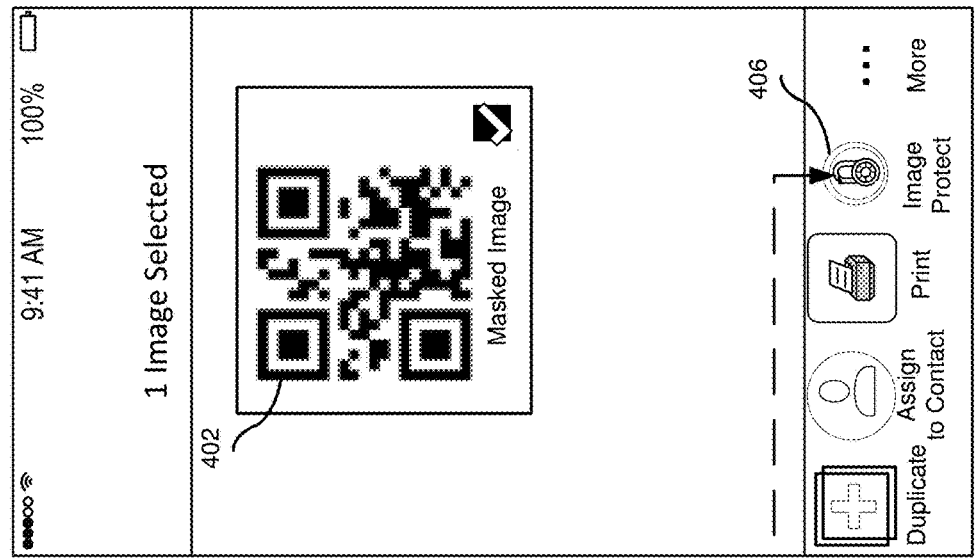
FIG. 4 is a block diagram of example user interfaces generated by an example system for utilizing metadata for protecting against the sharing of images in a computing network.
Figure 4:
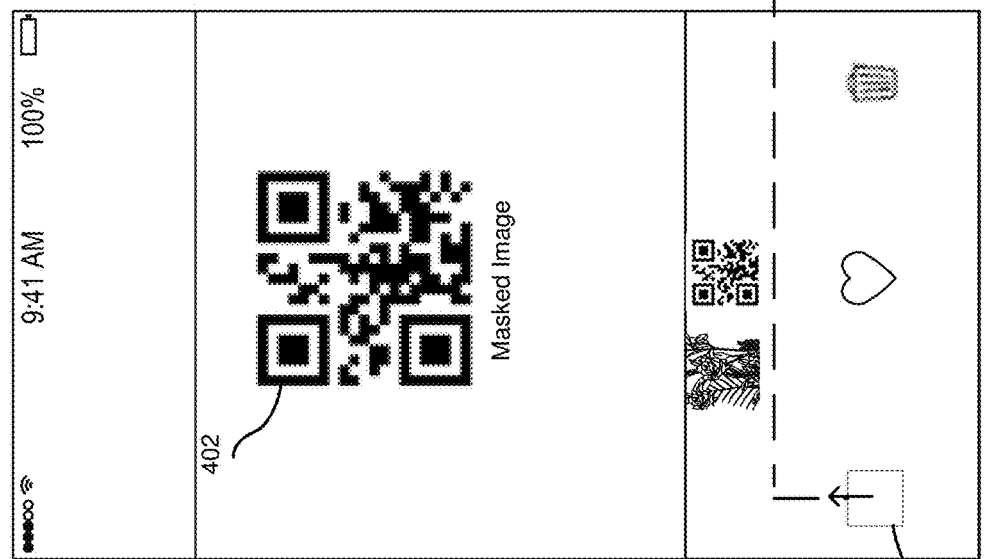

FIG. 4 shows example user interfaces 400 generated by an example system for utilizing metadata for protecting against the sharing of images in a computing network. The example user interfaces 400 may include a user interface of a masked image 402 encoded with metadata in a public folder of a photo album on a computing device.

For example, masked image 402 may correspond to a masked version of image file 116 encoded with metadata 124 pointing to file path 210 (for identifying image file copy 122 containing unmasked image 126) as discussed above with respect to FIG. 3. The user interface may further include a selectable user control 404 enabling a user to select masked image 402 and open a menu including an image protect control 406 that may be utilized for rendering the unmasked version of masked image 402 from a private folder in a secure data storage application (e.g., a sandbox application) on a computing device.

Figure 5:
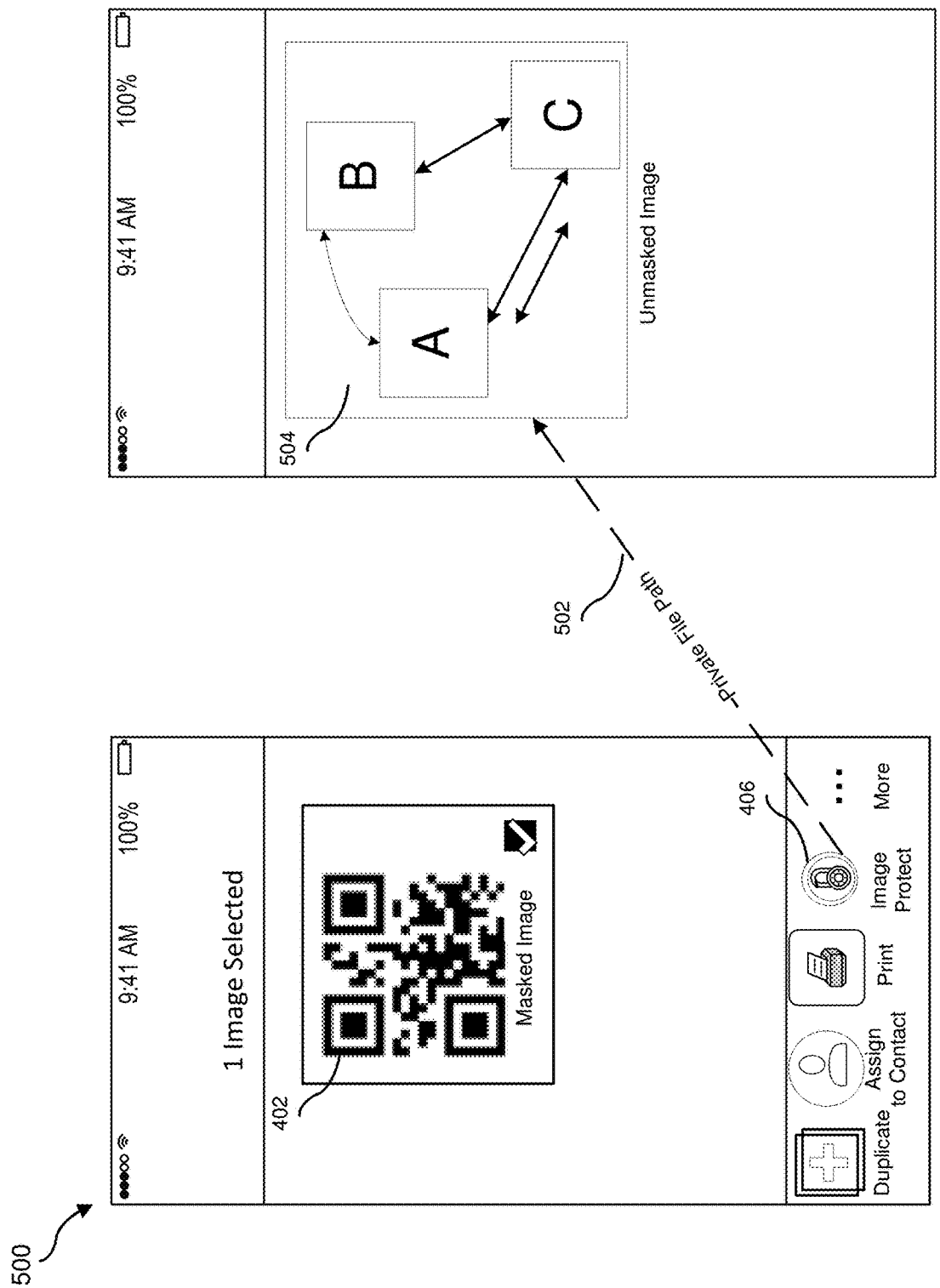
FIG. 5 is a block diagram of additional example user interfaces generated by an example system for utilizing metadata for protecting against the sharing of images in a computing network.

FIG. 5 shows additional example user interfaces generated by an example system for utilizing metadata for protecting against the sharing of images in a computing network. The example user interfaces 500 may include the user interface shown in FIG. 4 displaying image protect control 406 that may be utilized for rendering the unmasked version of selected masked image 402. For example, upon a user selection of image protect control 406, encoded metadata in the QR code displayed as masked image 402 may be decoded to retrieve private file path 502 pointing to the location of unmasked image 504 in a private folder in a secure data storage application (e.g., a sandbox application) on a computing device.

After private file path 502 has been decoded from the encoded metadata, the example user interfaces 500 may further include a user interface for rendering unmasked image 504 for display to a requesting user. As discussed above with respect to FIG. 3, unmasked image 504 may only be rendered to an authenticated user from the private folder in the secure data storage application. In this way, unmasked image 504 is protected from being viewed by other users and/or shared over a network (e.g., during a cloud backup of a user computing device). In some examples, unmasked image 504 may contain sensitive content that a user does not wish to share. For example, unmasked image 504 may show a workflow captured by a user's computing device from a whiteboard during a confidential meeting at the user's place of employment.

As explained in connection with method 300 above, the systems and methods described herein provide for protecting against the sharing of images in a computing network. A security application may be configured that protects the sharing of images on a user computing device by masking certain images (e.g., sensitive photographic images) while, concurrently, preserving metadata for use in reconstructing or revealing the original image. In some examples, the security application in the systems described herein may identify and save a copy of an original image file containing sensitive content within a private folder in a sandbox created by the security application. Then, the security application may generate metadata by encoding file path information including the location of the copy of the original image file into a visual pattern (e.g., a QR code) which may then be used to mask the original image in an image album on a user computing device. Thus, when the user (or anyone else) requests to view the original image, the security application will open the masked version including the visual pattern for display. The security application may then be utilized to scan the visual pattern for retrieving the encoded file path information for the copy of the original image file in the private folder and then render the unmasked image to a user within the security application. In other embodiments, the security application may be used to utilize metadata to mask an image in an original image file by encrypting the image and for later decryption as an unasked image by the security application.

Figure 6:
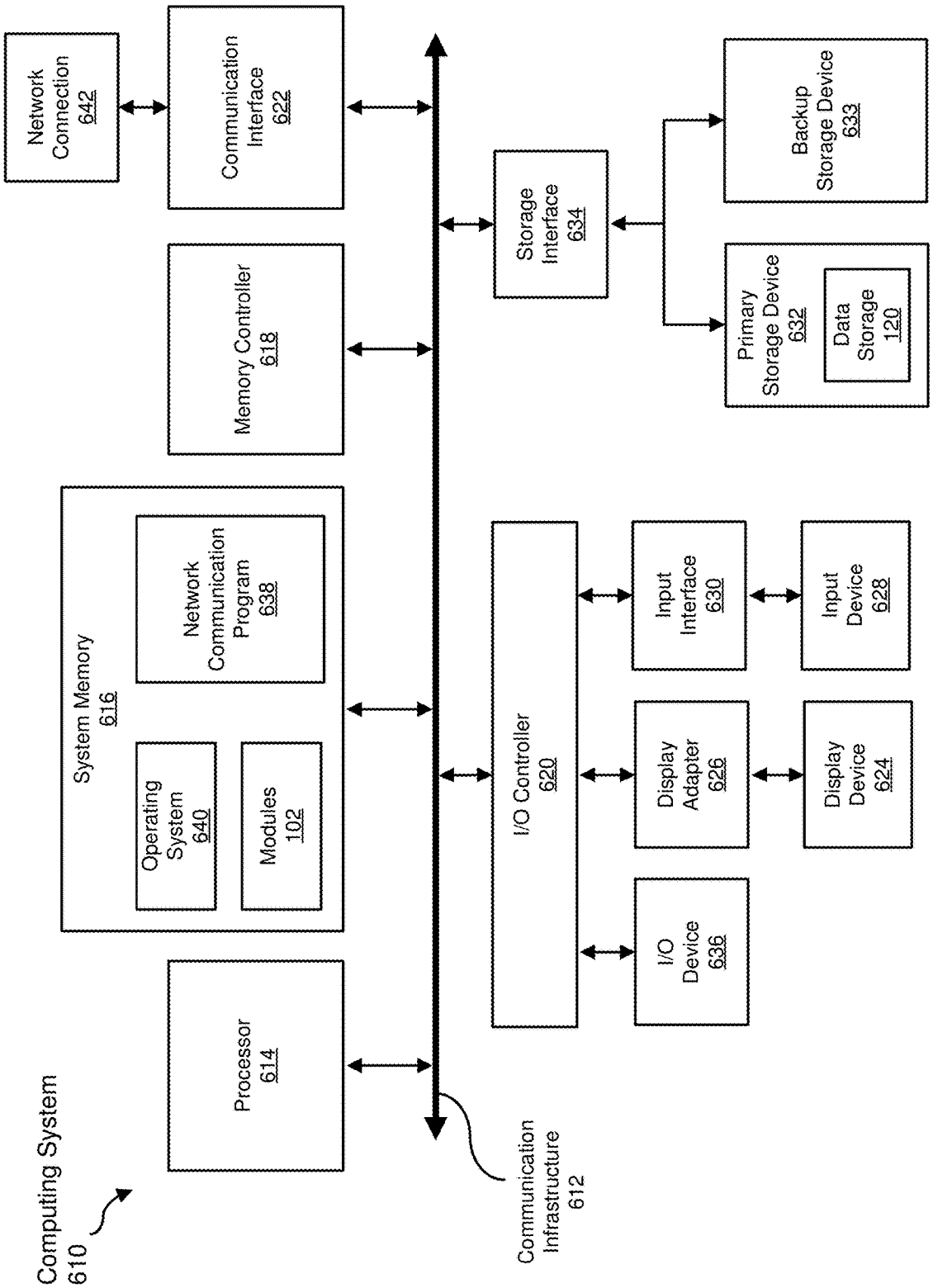
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
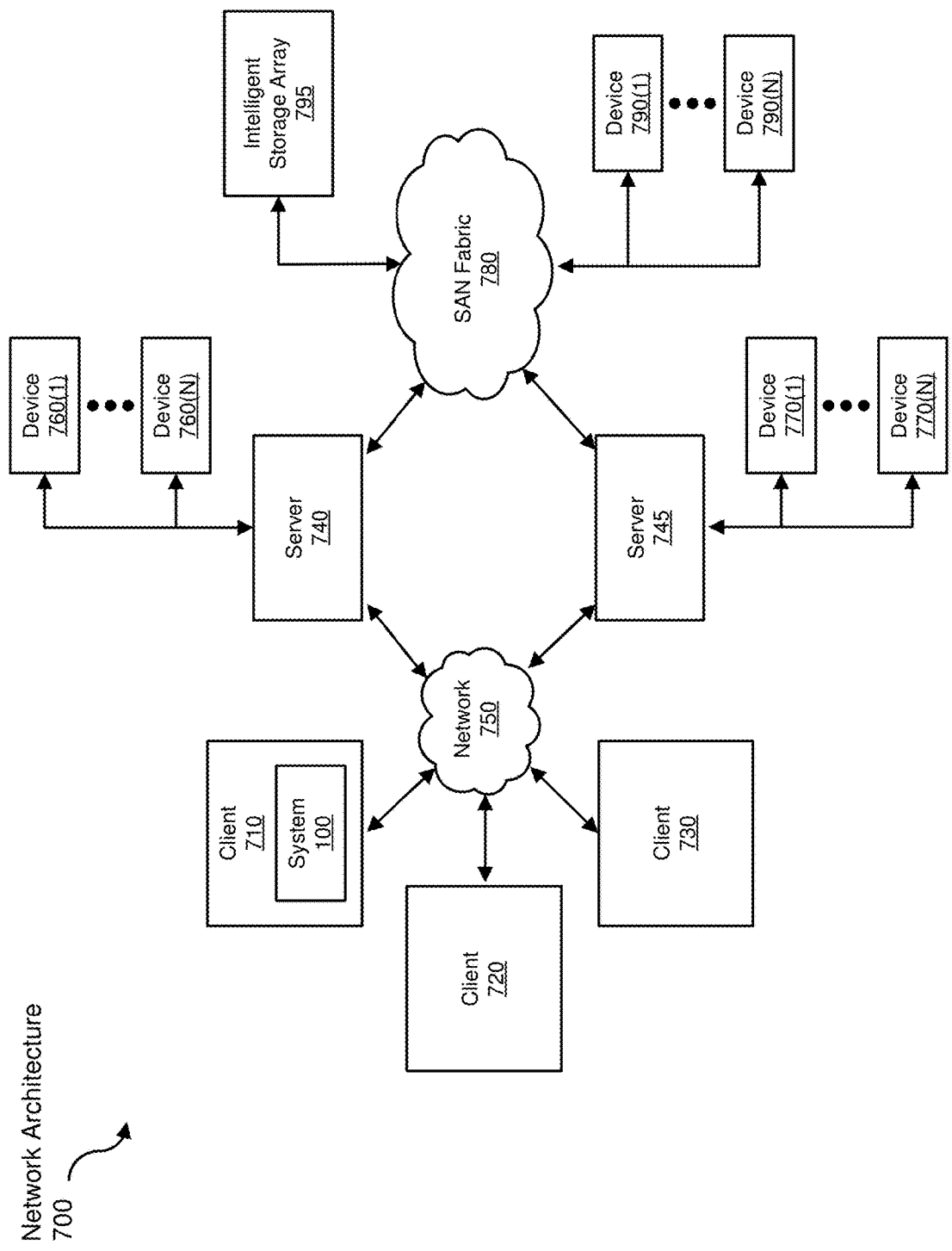
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for utilizing metadata for protecting against the sharing of images in a computing network.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for utilizing metadata for protecting against the sharing of images in a computing network, at least a portion of the method being performed by one or more computing devices comprising at least one processor, the method comprising:
   identifying, by the one or more computing devices, an image file stored in a public folder;
   storing, by the one or more computing devices, a copy of the image file within a secure data storage application;
   encoding, by the one or more computing devices, metadata for revealing an image in the image file from at least one of the image file and the copy of the image file in the secure data storage application, wherein encoding the metadata comprises encoding a file path pointing to a location of the copy of the image file into a visible pattern;
   performing, by the one or more computing devices, a security action that protects against sharing the image file from the public folder by masking the image in the image file with the encoded metadata, wherein performing the security action comprises overlaying the visible pattern over the image in the image file to prevent the image from being shared to a remote data storage service during a backup operation; and
   rendering, by the one or more computing devices, the image in the image file as an unmasked version of the image from the at least one of the image file and the copy of the image file in the secure data storage application by decoding the metadata utilized to mask the image in the public folder.

2. The computer-implemented method of claim 1, wherein storing the copy of the image file within the secure data storage application comprises saving the copy of the image file to a private folder of a sandbox application.

3. The computer-implemented method of claim 1, wherein performing the security action comprises overlaying a visible pattern over the image in the image file to prevent viewing of the image.

4. The computer-implemented method of claim 1, wherein rendering the unmasked version of the image from the at least one of the image file and the copy of the image file in the secure data storage application comprises:
   receiving a request to open the image file comprising the masked image in the public folder;
   authenticating the request;
   decoding the metadata to reveal the unmasked version of the image;
   retrieving the unmasked version of the image from the at least one of the image file and the copy of the image file; and
   rendering the unmasked version of the image in response to the request.

5. The computer-implemented method of claim 4, wherein rendering the unmasked version of the image comprises opening the copy of the image file to display the unmasked version of the image in a private folder within the secure data storage application.

6. The computer-implemented method of claim 5, wherein the private folder is restricted to authenticated users of the secure data storage application.

7. The computer-implemented method of claim 1, wherein the image comprises sensitive visual content.

8. The computer-implemented method of claim 1, wherein the public folder comprises a shared image album in an image application on the one or more computing devices.

9. A system for utilizing metadata for protecting against the sharing of images in a computing network, the system comprising:
   at least one physical processor;
   physical memory comprising a plurality of modules and computer-executable instructions that, when executed by the physical processor, cause the physical processor to:
   identify, by an identification module, an image file stored in a public folder on a computing device;
   store, by a storage module, a copy of the image file within a secure data storage application on the computing device;
   encode, by an encoding module, metadata for revealing an image in the image file from at least one of the image file and the copy of the image file in the secure data storage application, wherein encoding the metadata comprises encoding a file path pointing to a location of the copy of the image file into a visible pattern;
   perform, by a security module, a security action that protects against sharing the image file from the public folder by masking the image in the image file with the encoded metadata, wherein performing the security action comprises overlaying the visible pattern over the image in the image file to prevent the image from being shared to a remote data storage service during a backup operation; and
   render, by a rendering module, the image in the image file as an unmasked version of the image from the at least one of the image file and the copy of the image file in the secure data storage application by decoding the metadata utilized to mask the image in the public folder.

10. The system of claim 9, wherein the storage module stores the copy of the image file within the secure data storage application by saving the copy of the image file to a private folder of a sandbox application.

11. The system of claim 9, wherein the security module performs the security action by overlaying a visible pattern over the image in the image file to prevent viewing of the image.

12. The system of claim 11, wherein the rendering module renders the unmasked version of the image from the copy of the image file in the secure data storage application by:

receiving a request to open the image file comprising the masked image in the public folder;

authenticating the request;

decoding the metadata to reveal the unmasked version of the image;

retrieving the unmasked version of the image from the at least one of the image file and the copy of the image file; and rendering the unmasked version of the image in response to the request.

13. The system of claim 12, wherein the rendering module renders the unmasked version of the image by opening the copy of the image file to display the unmasked version of the image in a private folder within the secure data storage application.

14. The system of claim 13, the private folder is restricted to authenticated users of the secure data storage application.

15. The system of claim 11, wherein the image comprises sensitive visual content.

16. A non-transitory computer-readable medium comprising one or more computer-executable instructions that, when executed by at least one processor of a computing device, cause the computing device to:

identify an image file stored in a public folder on the computing device;

store a copy of the image file within a secure data storage application on the computing device;

encode metadata for revealing an image in the image file from at least one of the image file and the copy of the image file in the secure data storage application, wherein encoding the metadata comprises encoding a file path pointing to a location of the copy of the image file into a visible pattern;

perform a security action that protects against sharing the image file from the public folder by masking the image in the image file with the encoded metadata, wherein performing the security action comprises overlaying the visible pattern over the image in the image file to prevent the image from being shared to a remote data storage service during a backup operation; and render the image in the image file as an unmasked version of the image from the at least one of the image file and the copy of the image file in the secure data storage application by decoding the metadata utilized to mask the image in the public folder.

\* \* \* \* \*